US007679025B1

(12) United States Patent
Krishnan et al.

(10) Patent No.: US 7,679,025 B1
(45) Date of Patent: Mar. 16, 2010

(54) DENSE PLASMA FOCUS APPARATUS

(76) Inventors: Mahadevan Krishnan, 6250 Bullard Dr., Oakland, CA (US) 94611-3112; John R. Thompson, 812 Temple St., San Diego, CA (US) 92106

( * ) Notice: Subject to any disclaimer, the term of this patent is extended or adjusted under 35 U.S.C. 154(b) by 0 days.

(21) Appl. No.: 11/057,040

(22) Filed: Feb. 4, 2005

(51) Int. Cl.
*B23K 10/00* (2006.01)
*H05H 1/24* (2006.01)

(52) U.S. Cl. ............................ 219/121.48; 219/121.52; 219/121.57; 376/145; 315/111.61; 313/231.41

(58) Field of Classification Search ............ 315/111.51; 219/121.57, 121.54, 121.52; 313/231.41; 376/145
See application file for complete search history.

(56) References Cited

U.S. PATENT DOCUMENTS 3,445,722 A * 5/1969 Fleischmann et al. .. 315/111.41
3,715,595 A * 2/1973 Josephson ................... 376/145
3,939,816 A * 2/1976 Espy ............................. 124/3
3,997,748 A * 12/1976 Harris ......................... 218/123
4,103,143 A * 7/1978 Yamauchi et al. ....... 219/145.21
4,252,605 A * 2/1981 Schaffer ...................... 376/125
4,386,258 A * 5/1983 Akashi et al. .......... 219/121.48
4,548,033 A * 10/1985 Cann ......................... 60/203.1
4,596,030 A * 6/1986 Herziger et al. ............. 378/119
4,627,086 A * 12/1986 Kato et al. .................. 378/119
4,766,855 A * 8/1988 Tozzi ...................... 123/143 B
4,952,843 A * 8/1990 Brown et al. ........... 315/111.81
4,972,757 A * 11/1990 Nissl et al. ........................ 89/8
4,992,696 A * 2/1991 Prueitt et al. ................ 313/154
5,014,289 A * 5/1991 Rothe ......................... 378/122
5,076,223 A * 12/1991 Harden et al. ........... 123/143 B
5,397,962 A * 3/1995 Moslehi ................. 315/111.51
5,648,701 A * 7/1997 Hooke et al. ........... 315/111.21
5,830,377 A * 11/1998 Johnson ................. 219/121.36
5,847,493 A * 12/1998 Yashnov et al. ......... 313/231.31
6,064,072 A 5/2000 Partlo et al.
6,486,593 B1 * 11/2002 Wang et al. ............ 313/231.31
6,586,757 B2 7/2003 Melnychuk et al.
6,590,959 B2 7/2003 Kandaka et al.
6,690,764 B2 2/2004 Kondo (Continued)

OTHER PUBLICATIONS

Joseph Mather, Paul Bottoms, "Characteristics of the Dense Plasma Focus Discharge", Physics of Fluids vol. 7 No. 3, Mar. 1968.

(Continued)

*Primary Examiner*—Stephen J Ralis
(74) *Attorney, Agent, or Firm*—File-EE-Patents.com; Jay A. Chesavage

(57) ABSTRACT

An apparatus for the formation of a dense plasma focus (DPF) has a center electrode formed about an axis, where the center electrode includes a cylindrical part and a tapered part. An outer electrode is formed about the center electrode, and may be either cylindrical, tapered, or formed from a plurality of individual conductors including a helical conductor arrangement surrounding the tapered region of the center conductor. The taper of the center electrode results in an enhanced azimuthal B field in the final region of the device, resulting in increased plasma velocity prior to the dense plasma focus. Using the outer electrode helical structure an auxiliary axial B field is generated during the final acceleration region of the plasma, which reduces axial modal tearing of the plasma in the final acceleration region.

15 Claims, 4 Drawing Sheets

U.S. PATENT DOCUMENTS

| | | | | |
|---|---|---|---|---|
| 6,744,060 | B2 | 6/2004 | Ness et al. | |
| 6,765,216 | B2 * | 7/2004 | Kagadei et al. | 250/423 R |
| 6,787,788 | B2 | 9/2004 | Shell et al. | |
| 6,815,700 | B2 | 11/2004 | Melnychuk et al. | |
| 2003/0121894 | A1 * | 7/2003 | Sanders et al. | 219/121.39 |
| 2003/1016860 | * | 9/2003 | Ji et al. | 250/396 R |
| 2004/0022341 | A1 * | 2/2004 | Leung et al. | 376/144 |

OTHER PUBLICATIONS

Pert, "A Simple Model of the Coaxial Plasma Gun With Positive Central Electrode", British Journal App. Phys, vol. 2 Ser 1, 1968.

Ware et al, "Design and Operation of a Fast High-Speed Vacuum Switch", Review of Scientific Instruments, V42 No. 4 Apr. 1971.

Mather et al, "Electron Beam and Dense Plasma Focus Interaction Heating Experiments", Journal Applied Physics, vol. 44, No. 11, Nov. 1973.

Burkhalter et al, "Quantitative X-Ray Emission From a DPF Device", Review of Scientific Instruments, 63(10), Oct. 1992.

Lee and Serban, "Dimensions and Lifetime of the Plasma Focus Pinch", IEEE Transactions on Plasma Science, V24 No. 3, Jun. 1996.

Lee et all, High Rep Rate High Performance Plasma Focus as a Powerful Radiation Source, IEEE Transactions on Plasma Science, V26 No. 4, Aug. 1998.

Argawala et al, Characteristics of Electrons in the Beam Generated in Dense Plasma Focus Device, ICPP & $25^{TH}$ EPS Conference on Fusion & Plasma Physics, Jun. 29, 1998.

Gribkov, "On Possible Formulation of Problems of a Dense Plasma Focus Used in Material Science", Nukleonika 2000; 45(3): 149-153.

Rapezzi et al, "Development of a Mobile & Repetitive Plasma Focus," Institute of Physics Publishing, Plasma Sources Sci Tech 13(2004) 272-277.

* cited by examiner

Figure 1:
Mather Geometry with Radial Initiator
Prior Art 10
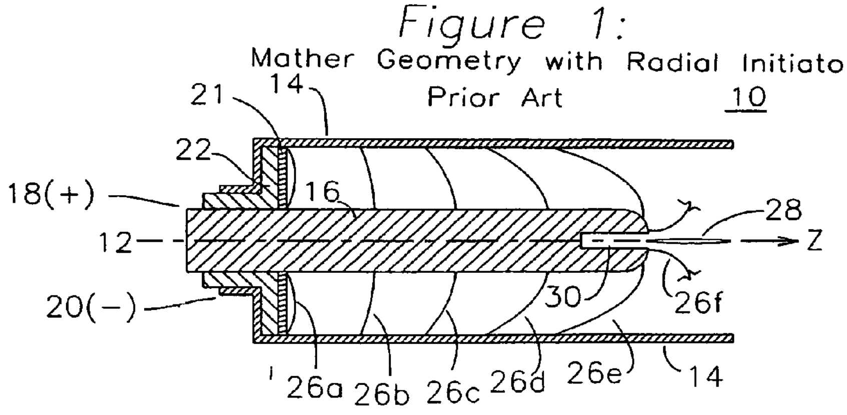
Figure 2:
Power Source
Prior Art
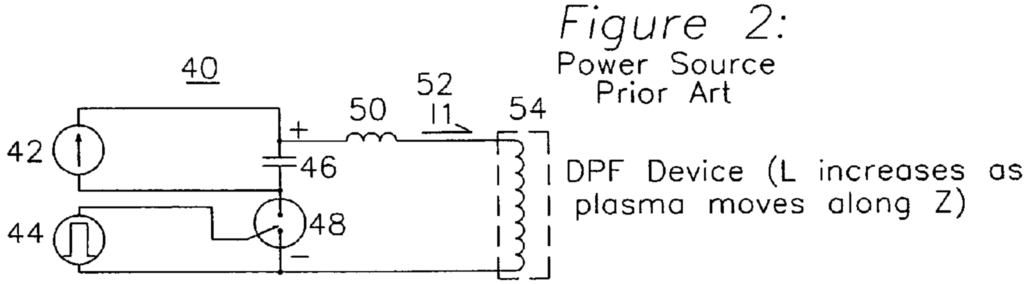
Figure 3:
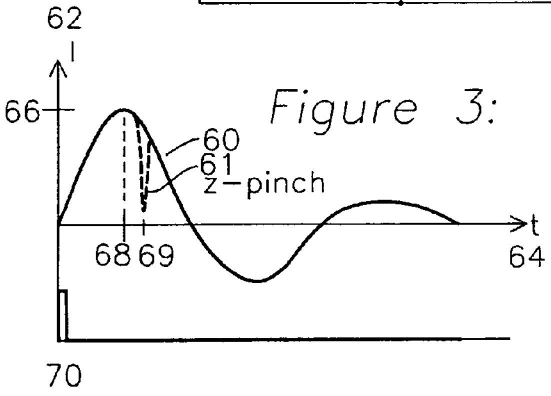
Figure 4a:
Initial flux
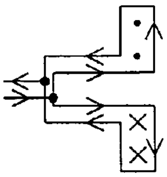
Figure 4b:
Terminal flux
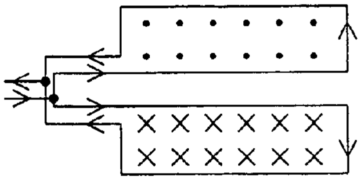
Figure 5a:
Figure 5b:
Figure 5c:
Figure 5d:
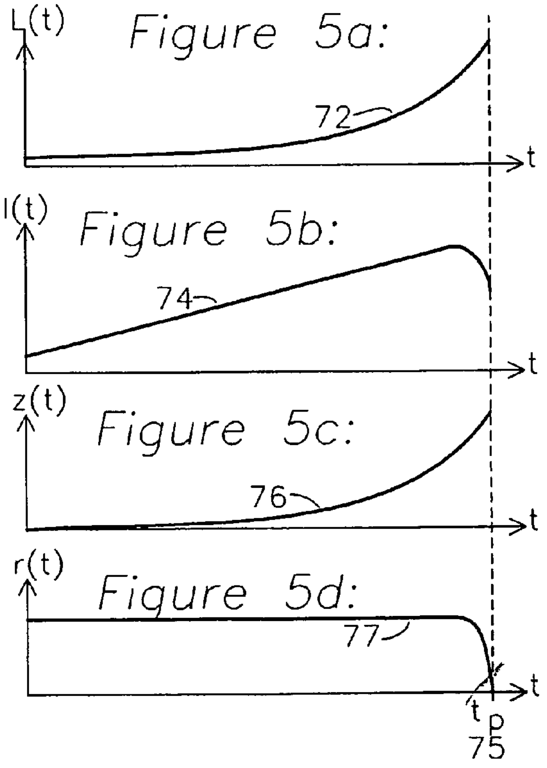

Fillipov Geometry with Coaxial Initiator
Prior Art

Conical Anode & Cylindrical Cathode, Radial Ignition

Conical Anode & Cylindrical Cathode, Axial Ignition

Conical Anode & Cathode
120

B Field Profiles only 1 of n helical conductors shown for clarity

Section a–a

Section b–b

Section c–c

Time-sequence transverse E&B field view of Fig. 10

DENSE PLASMA FOCUS APPARATUS

FIELD OF THE INVENTION

The present invention relates to the class of devices which form a plasma and use a self-generated B field to accelerate the plasma towards a pinch zone, thereby forming a dense plasma focus (DPF) which may be used as the source of formation of a variety of particles such as neutrons or x-rays.

BACKGROUND OF THE INVENTION

An apparatus for the formation of a dense plasma focus (DPF) was described and characterized in "Characteristics of the Dense Plasma Focus Discharge" by Mather and Bottoms in 1968, one implementation of which is shown in the cross section view of FIG. 1. Independent discovery by Filippov using the geometry of FIG. 6 also occurred in Russia around the same time. The primary difference between the Mather geometry of FIG. 1 and the Filippov geometry of FIG. 6 is the radial to axial geometric aspect ratio and radial vs coaxial plasma initiation. Referring to FIG. 1, a high voltage is applied from a capacitor through a switch to the DPF device, with a positive potential connected to a terminal 18 which is coupled to a cylindrical inner electrode 16, and a negative or ground potential applied to a terminal 20 formed from a cylindrical outer electrode 14 having a central axis 12. The region between the inner and outer electrodes, and downstream of the central electrode, is filled with a working gas which is typically at a fixed pressure and extends throughout the DPF region. The type of working gas is selected based upon the particular application of the DPF. An insulator 22 is disposed between the positive electrode 16 and negative or grounded electrode 14 to isolate the two electrodes, and a refractory (high melting point and heat resistant) insulating disc 21, typically ceramic or glass, is placed on the insulator 22 surface to encourage the initial formation of the plasma 26*a* on the radial surface of the disc 21 without the high temperature plasma causing the insulator 22 to melt or vaporize. The plasma is formed through the ionization of the gas disposed in the plasma chamber, and the nature of the plasma is determined by the atomic composition of the gas. The plasma 26*a* is the result of electrons emitted from the negative electrode 14, which are accelerated by the local electric field towards the positive electrode 16. The accelerated electrons strike the insulator surface or collide with neutral gas atoms and/or molecules, generating secondary free electrons. The secondary electrons are further accelerated under the influence of the local electric field, again striking the insulator surface or colliding with the neutral gas, thereby producing further free electrons. This secondary electron emission process continues in a cascade, eventually leading to a complete electrical breakdown through the gas across the insulator surface producing the initial plasma 26*a*. This statistically driven process must occur nearly simultaneously at all azimuths in order to form a circumferentially uniform plasma extending across the radial extent of the insulator for proper operation. Although the operation polarity of the inner and outer is typically as shown, the polarity may be favorably reversed as long as the initiating plasma 26*a* is properly formed as described above. The current flowing through the plasma generates a circumferential magnetic B field as shown in FIG. 4*a*, and this B field exerts a J×B Lorenz force on the particles of the plasma, thereby accelerating the plasma along the Z axis. The magnetic field generated by the radial current varies inversely with radius away from the center electrode, creating a radial gradient in magnetic field. The radial magnetic field gradient results in an axial J×B Lorenz force gradient, which has a largest magnitude near the center electrode. This larger magnitude Lorenz force causes the plasma near the center electrode to accelerate faster than the plasma near the outer electrode, resulting in an accelerated curved surface or plasma front, as shown in the plasma profile progression 26*b*, 26*c*, 26*d*, and 26*e* of FIG. 1. As the plasma accelerates forward, the neutral gas in front of the plasma surface is shock heated, swept up, and snowplowed forward by the advancing plasma front into an increasingly dense mass of ionized gas atoms, which also experiences radially outward motion due to the curvature of the plasma surface, thereby shedding part of the accumulated mass by the time the plasma front reaches the end of the center electrode 16 at position 26*e*. When the plasma front begins to advance beyond the tip of the center electrode 16, the return current path from the plasma front to the center electrode begins to include an ionized outer shell of the gas located off the end of the center electrode. The increased magnetic field nearer the axis causes the newly included plasma shell at the end of the electrode 16, as shown in the partial plasma surface 26*f* to accelerate radially inwards towards the axis, collapsing into a z-pinch zone 28, which generates a very dense plasma focus, causing the emission of radiation and high energy particles; the radiation is typically emitted isotropically whereas the particle emission may occur predominantly along the Z axis. The high energy particles (ions) thus generated propagate forward to couple out of the device, while the counter-propagating particles (electrons) can damage the center electrode through excessive heat formation from inelastic collisions with the electrode, and can also result in the generation of undesired secondary debris from the electrode. While not required for operation of the DPF device, a counter bore 30 is often added to the center electrode to allow for the spatial diffusion of these particles, and the center electrode may also be water-cooled to mediate the heat load from these particles.

FIG. 2 shows a prior art power source for a dense plasma focus device. A source of charge, shown as a current source 42, is coupled to a storage capacitor 46. When the capacitor 46 is charged, a high voltage pulse is delivered from a pulse generator 44 to a low-inductance ignitron-like switch 48, which comprises a trigger terminal proximal to one of the main current carrying terminals. When the high voltage pulse from generator 44 causes an ionic breakdown near this terminal, the ionic discharge spreads across the switch 48, thereby providing a low impedance and completing the circuit between storage capacitor 46 and the DPF device 54. Intrinsic series inductance 50 represents capacitor, switch, and lead inductance between the capacitor 46 and the DPF 54, which can be minimized in any of the many ways known in the prior art, including the use of wide and closely spaced conductors in the high current loop enclosing switch 48, capacitor 46, and DPF 54. The wide conductors reduce the current density carried, thereby reducing the B field generated, and the use of close proximal spacing of these conductors reduces the enclosed area and resulting stray inductance. The DPF 54 generates an enclosed magnetic flux volume with an associated inductance which increases as the plasma front, initially generated at the time of electrical breakdown across plasma initiation surface insulator 21, advances down the Z axis. The initial plasma enclosed flux is shown in the cross section view of FIG. 4*a*, and the terminal enclosed flux immediately prior to the z-pinch zone 28 of FIG. 1 is shown in FIG. 4*b*, with the currents shown schematically as arrows in the inner and outer conductors of DPF 10 of FIG. 1, where the dot and x represent the head and tail, respectively, of the circumferential magnetic field vector.

FIG. 3 shows the waveform 60 for current 62 versus time 64 for current 1152 of FIG. 2. The initiator pulse generator 44 produces a high voltage pulse waveform 70 which closes the ignition-like switch 48, thereby starting the plasma formation and motion in the DPF 54, shown by waveform 60. The magnitude of current 62 reaches a peak value 66 in a time 68, thereafter falling off in a damped second order resonance determined by the loss of stored capacitor energy to the plasma and a resonance determined by the time-dependant inductance of the DPF 54, the fixed intrinsic inductance 50 of FIG. 2, and the capacitance of capacitor 46 FIG. 2. In the design of the DPF, it is desired to cause the maximum current 66 to occur at a time 68 which corresponds to the plasma reaching a region immediately before the pinch zone, shown as 26*e* of FIG. 1. The effect of the radial plasma pinch phase of the operation of the DPF 54 is shown as the drop in current 61 at the pinch time 69, which recovers after the pinch radially rebounds or a new arc forms near the plasma initiation insulator surface 21. By designing the DPF such that the pinch occurs at time 69 shortly following the maximum current level 66 at time 68, the energy of the capacitor 46 is maximally transferred to the formation of the plasma pinch 28. The selection of the size and voltage of capacitor 46, the length of plasma annulus between inner electrode 16 and outer electrode 14, inner electrode axial length, and plasma gas pressure are interrelated in a complicated manner. The time 68 of maximum current 66, which is where the plasma front should be physically close to the radial Z-pinch zone 28 is determined by the inductance 54 of the DPF, which is itself both a function of DPF 10 geometry, as well as a time-dependent function of the DPF inductance as the plasma front moves along the z axis. Additionally, the speed with which the plasma advances is determined by the gas fill pressure in the chamber, as is the optimum plasma pinch radiation or particle generation for a particular gas.

FIGS. 5*a*, 5*b*, 5*c* and 5*d* show the waveforms of operation for a optimized DPF device. Current waveform 60 of FIG. 3 reaching a maximum current 66 at time 68 corresponds to current waveform 74 of FIG. 5*b* reaching a maximum shortly before the z-pinch time 75. The current waveform 74 is shown as an initially linear function for simplicity, but may be changed to a higher order function by the effect of the increased accumulated mass in the plasma front during its axial and radial propagation, thereby counteracting the magnetic acceleration force of the plasma, and the loss of mass in the plasma front caused by the plasma front curvature, enhancing acceleration by the magnetic force. The inductance 54 of the device of FIG. 1 is shown in waveform 72 of FIG. 5*a*, and the inductance 72 would increase linearly with time if the plasma traveled in Z with linear velocity, however as the plasma is accelerating in Z, this causes a non-linear increase in inductance with time. Onset of the radial plasma motion at the end of the center electrode 16 results in an even more rapid increase in the rate of inductance growth, as the driving magnetic field and current density are now increasing with decreasing radius, hence their product (J×B), the accelerating magnetic force, increases quadratically with decreasing radius. Waveform 76 of FIG. 5*c* shows the displacement z as the plasma accelerates along the Z axis as a function of time. Waveform 77 shows the inner radius of the plasma front constrained by the diameter of the inner electrode 16 until it finally radially collapses shortly before the time 75 the plasma enters the pinch zone 28 of FIG. 1. As is obvious to one skilled in the art, the waveforms of FIG. 5*a*, 5*b*, 5*c*, and 5*d* are for illustrative purposes only, and change shape and slope with varying gas pressure, geometries, and applied plasma voltages and currents.

FIG. 6 shows the smaller length-to-diameter aspect ratio of the DPF device geometry of Filippov, which includes an axial plasma initiation 92, in contrast with the radial initiation 26*a* of FIG. 1. Axial plasma initiation is also commonly used in some implementations of DPF 10. In the geometry of Filippov, an inner electrode 82 is formed about an axis 80, and separated from an outer electrode 86 by an insulator 84, whose geometry allows for the formation of an axially-aligned, azimuthally continuous plasma 92 over the exposed surface of the insulator 84, in a process similar to that described earlier for the insulator 21 of FIG. 1. The plasma surface of the insulator 84 may be fabricated from a refractory insulator material, typically a ceramic or glass, as was earlier described for FIG. 1. The plasma 92 initially advances both radially outward towards electrode 86 and axially along 98. Upon reaching the axial extent of the central electrode 82, the plasma front begins to incorporate gas at the end of the center electrode, which is then accelerated radially inward across the front surface of the center electrode 82, and axially beyond the insulator 84, accelerated by the Lorentz force formed by the B field and plasma current density J, as was described for FIG. 1. The advancing plasma 94 accelerates across the front surface of the electrode 82 and accumulates the ambient gas into an azimuthally symmetric pinch zone 90, which results in the generation of high-energy particles 98 mostly along the axis 80 and having a generally isotropic radiation pattern.

The Mather device of FIG. 1 and the Filippov device of FIG. 6 may be viewed as analogs of each other, the primary difference being the axial to radial geometric aspect ratio which determines whether the duration of the initial axial or final inward radial motion of the DPF operation involves the larger fraction of the DPF operational time. For devices operating in similar modes, the device of FIG. 1 includes a z-axis length for axial acceleration of the plasma up to the time of peak current 66 shown in FIG. 2, prior to the radial motion into the pinch zone 28, while the device of FIG. 6 has an equivalent radial distance allowing an optimally selected peak current to be reached prior to the inward radially accelerating plasma front reaching the pinch zone 90. Additionally, the initiation plasma formation insulator geometries may be either axial or radial, such that FIG. 1 may be modified to generate an axial initial plasma, or the initiator of FIG. 6 may be modified to generate a radial initial plasma without loss of function. Both geometries result in a z-pinch zone on axis whereby the accumulated neutral gas, now a plasma, collides on axis with a velocity sufficiently to generate a high temperature and density plasma which generates the high energy particles, primarily axially, and radiation, primarily isotropically.

In the prior art axial geometry of FIG. 1, the inner electrode is maintained at a sufficiently large diameter to reduce the B field in the vicinity of the electrode. This is done to prevent the velocity of the plasma close to the inner electrode and the plasma near the outer electrode from diverging to such a large extent that the plasma tears and separates. When the plasma current flow is interrupted in this manner, the B field causing the plasma acceleration leaks through the tear, ahead of the plasma front, reducing or eliminating the efficiency of the final z-pinch. An electrode geometry is desired which minimizes the tearing of the plasma in a final phase of acceleration while maximizing the resultant radial velocity of the plasma into the pinch zone. Additionally, it is desired to impart an axial component of B field in the z-pinch zone behind the plasma front for axial stabilization of the plasma front immediately prior to the z-pinch zone.

OBJECTS OF THE INVENTION

A first object of the invention is a dense plasma focus device having a cylindrical outer electrode, and an inner electrode having a cylindrical part and a tapered part, and an axial plasma initiation.

A second object of the invention is a dense plasma focus device having a cylindrical outer electrode, and an inner electrode having a cylindrical part and a tapered part, and a radial plasma initiation.

A third object of the invention is a dense plasma focus device having an outer electrode with a cylindrical part and a tapered part, and an inner electrode having a cylindrical part and a tapered part.

A fourth object of the invention is a dense plasma focus device having an outer electrode with a cylindrical part and a tapered part, and an inner electrode having a cylindrical part and a tapered part, and an initiator which generates an axial plasma.

A fifth object of the invention is a dense plasma focus device having an outer electrode with a cylindrical part and a tapered part, and an inner electrode having a cylindrical part and a tapered part, and an initiator which generates a radial plasma.

A sixth object of the invention is a dense plasma focus device having an inner electrode comprising a cylindrical part defining a first acceleration extent, and a tapered part defining a final acceleration extent, and an outer electrode having a cylindrical part formed from individual conductors parallel to and uniformly spaced from the axis over the first acceleration extent, and a tapered part formed by the same axial conductors formed into a tapered helix over the final acceleration extent, and an initiator which generates an axial plasma.

A seventh object of the invention is a dense plasma focus device having an inner electrode comprising a cylindrical part defining a first acceleration extent, and a tapered part defining a final acceleration extent, and an outer electrode having a cylindrical part formed from individual conductors parallel to and uniformly spaced from the axis over the first acceleration extent, and a tapered part formed by the same axial conductors formed into a tapered helix over the final acceleration extent, and an initiator which generates a radial plasma.

SUMMARY OF THE INVENTION

In a first embodiment, an inner electrode is placed on an axis, the inner electrode having a cylindrical part and a tapered part, the inner electrode being separated from an outer cylindrical electrode in a region of initial plasma formation by a refractory insulator, which may consist of a ceramic or glass plasma formation surface. The insulator serves to electrically isolate the inner electrode and outer electrode, and the refractory part of the insulator serves to provide a plasma initiation surface that is not consumed or damaged by the high temperature plasma and protects any underlying insulator. For all of the present embodiments, the refractory insulator which is used for plasma formation may generate either a radial or an axial initial plasma geometry. For the radial plasma geometry initiator, the insulator includes a refractory insulator disk along which the plasma is radially formed from the outer electrode to the inner electrode, and after initiation of the arc, the plasma expands to form a sheet which is substantially radial to the axis. In the axial initiator geometry, the insulator may be positioned to form the initial plasma coaxial to the axis and adjacent to the inner electrode. The radial initiator insulator may include a refractory insulator sleeve over which the initial plasma forms and spreads into a cylindrical initial plasma. Whether the plasma initiates radially or axially, at the end of the cylindrical extent of the inner electrode of the first embodiment, the tapered part of the inner electrode guides the axially advancing plasma to a region of increased acceleration prior to a pinch zone located substantially on the axis and beyond the axial extent of the inner electrode. The tapered part of the inner electrode has an extent and taper slope which are selected to allow for an optimum final plasma acceleration while still providing for a continuous plasma front immediately prior to reaching the pinch zone.

In a second embodiment, an inner electrode is placed on an axis, the inner electrode having a cylindrical part and a tapered part, and a generally coaxial outer electrode is placed on the axis, the outer electrode generally maintaining a constant coaxial spacing from the inner electrode, such that the outer electrode also has a cylindrical part and a tapered part. The inner electrode is separated from the outer electrode by an insulator which also includes a plasma formation section fabricated from a refractory insulator material, such as ceramic or glass, that is resistant to melting in proximity to the high temperature initial plasma. The plasma initiator may produce either an axial or a radial initial plasma, as was described for the first embodiment.

In a third embodiment, an inner electrode is placed on an axis, the inner electrode having a cylindrical part and a tapered part. The outer electrode is formed from a plurality of conductors which are disposed a fixed distance from the inner electrode and also parallel to the axis, the conductors separated from the inner electrode by a substantially fixed distance over a first acceleration extent where the inner conductor is cylindrical. The outer electrode conductors in the initial axial section need not be mechanically or electrically isolated. In the tapered region of the inner conductor, a region of which defines a final acceleration extent, the plurality of conductors are helically arranged, and tapered to approximately match the taper of the inner electrode, with each conductor maintaining a spatial isolation from the other conductors, such that current returning from the plasma front to the outer electrode generates an axial B field component. This axial B field serves to reduce axial modal tearing in the plasma as the plasma converges radially into the pinch zone, thereby allowing for increased plasma front stabilization and improved high energy particle or radiation production.

BRIEF DESCRIPTION OF THE DRAWINGS

FIG. 1 shows a prior art Mather coaxial geometry with a radial plasma initiator.

FIG. 2 shows the circuit diagram for a prior art dense plasma focus device.

FIG. 3 shows the waveforms for a dense plasma focus device.

FIGS. 4*a* and 4*b* show flux diagrams for a dense plasma focus device.

FIGS. 5*a* through 5*d* show the waveforms for a dense plasma focus device.

DETAILED DESCRIPTION OF THE INVENTION

Figure 6:
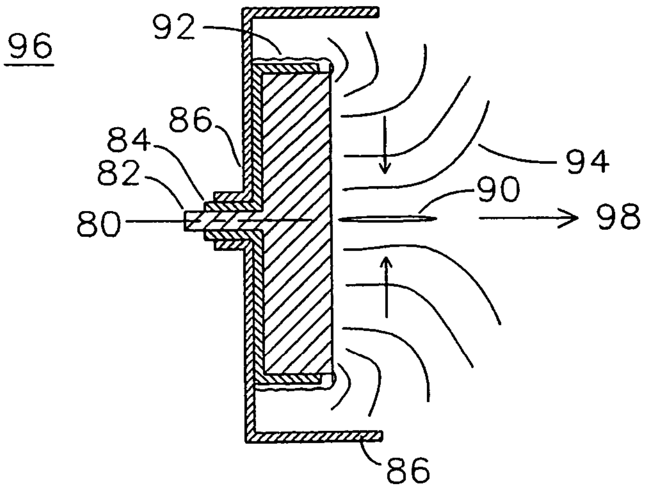
FIG. 6 shows a prior art Filippov geometry including an axial initiator for a dense plasma focus device.
Figure 7A:
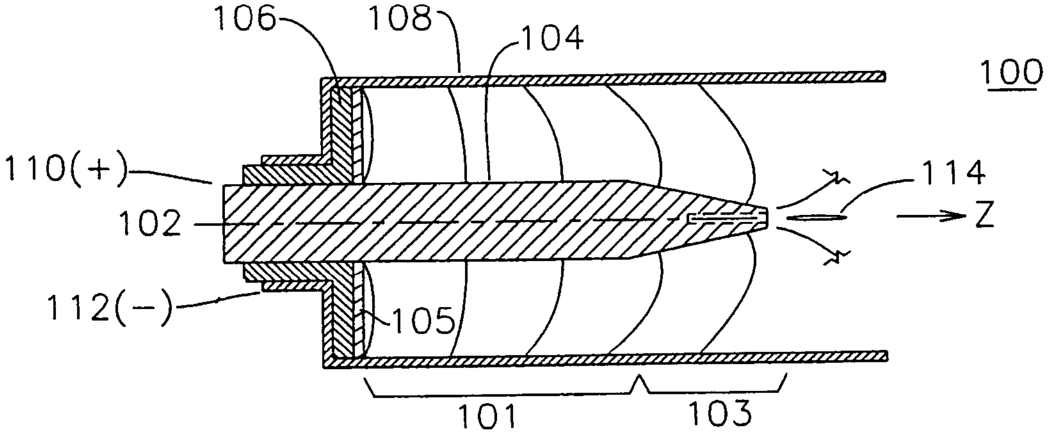
FIG. 7*a* shows a dense plasma focus apparatus having a conical anode, cylindrical cathode, and a radial plasma initiator.

FIG. 7*a* shows a dense plasma focus device 100 having an axis 102 and an inner electrode 104 which is cylindrical over a first plasma acceleration extent 101 and tapered over a final plasma acceleration extent 103. The inner electrode 104 is surrounded by a cylindrical outer electrode 108, and is insulated in a plasma initiation end by insulator 106. The insulator 106 serves to ensure the electrical isolation of the inner electrode 104 from the outer electrode 108. On a surface of insulator 106 is a plasma formation surface which is formed from a refractory insulator 105, typically ceramic or glass, which allows the repetitive formation of a high temperature plasma without damaging the underlying insulator 106. After formation of the initial plasma on the surface of the plasma formation disk 105, the plasma expands into an azimuthally continuous radial sheet from the inner electrode 104 to the outer electrode 108. The insulators 105 and 106 also provide a region behind the plasma for the generation of an azimuthally oriented B field. The relative polarity of the inner and outer electrodes is typical as shown, but may be reversed for improved performance in some applications, as long as proper generation of the insulator plasma is preserved. The ionized gas particles of the plasma encounter a Lorenz force acceleration in the Z axis direction from the current path enclosed B field and the radial current of the plasma, which accelerates the plasma along the Z axis, as was described for FIG. 1. As the plasma accelerates along the Z axis, it enters the final axial acceleration extent 103, which is defined by the tapered inner electrode 104. Since the magnetic field density B varies as 1/r, where r is the radial distance from the center axis, during the first plasma acceleration extent 101, the magnetic B field gradient from inner plasma to outer plasma is minimized by utilizing a larger radius inner electrode 104. In the final acceleration region 103, the tapered inner electrode results in increased B field acceleration in the final region. By tapering only the final acceleration region of the plasma, the enhanced radial B field is available to accelerate the plasma immediately prior to the pinch zone 114 while retaining lower plasma front velocities during the region 101.

Figure 7B:
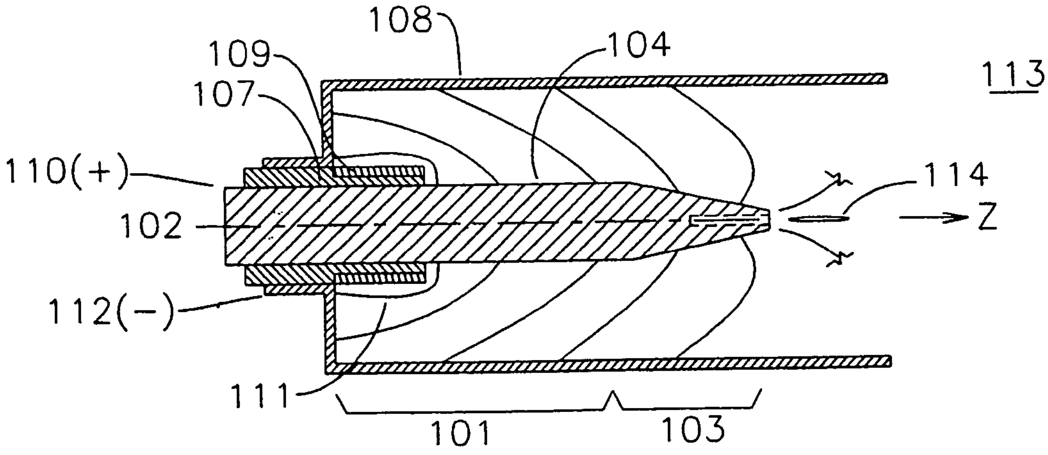
FIG. 7*b* shows a dense plasma focus apparatus having a conical anode, cylindrical cathode, and an axial plasma initiator.

FIG. 7*b* shows a dense plasma focus device 113 similar to FIG. 7*a* with an axial initial plasma generator geometry. The inner electrode 104 and outer electrode 108 are similar to those of FIG. 7*a*, but the cylindrical insulator 107 is arranged coaxially along the center electrode 104, thereby causing the initial plasma to form on the coaxial plasma formation surface 109 of the insulator 107. The relative polarity of the inner and outer electrodes is typical as shown, but may be reversed for improved performance in some applications, as long as proper initiation of the initiator plasma is preserved. After initiation, the plasma expands to a coaxial band surrounding the center conductor 104, simultaneously forming a radially oriented plasma front at the end of the coaxial plasma band nearest the end of the center electrode. This newly formed radial plasma front then accelerates initially axially, and finally both axially and radially towards the z-pinch zone 114. As was described for FIG. 7*a*, the plasma initiator surface 109 may be fabricated from a refractory insulator such as a ceramic or glass which may be repetitively exposed to high temperature plasma without melting the underlying insulator 107 or plasma initiation surface 109.

In the radial plasma initiator geometry of FIG. 7*a* and the axial plasma initiator geometry of FIG. 7*b*, the first acceleration extent 101 and the final acceleration extent 103 are chosen to optimize plasma conditions in plasma focus region 114. This optimization is iterative in nature, and includes the variables capacitance and initial voltage of capacitor 46 of FIG. 2, the initial radius of inner electrode 104, final radius of inner electrode 104, and the annular distance from center electrode 104 to outer electrode 108, as well as the initial working gas fill pressure.

DPFs are known to operate most efficiently within a limited range of pressures, when the electrode geometry, current and current rise-time are fixed. The reason for this is that with too high a pressure, the initial current sheath breaks up into radial spokes, which leave most of the mass behind as they move down the electrodes and do not turn the corner to form a tight pinch. At too low a pressure, although the current sheath might be azimuthally uniform, the total mass accumulated in the final pinch is too low. In turn, the lower pressures cause the shock front to be accelerated too rapidly, leading to separation of the shock from the magnetic piston (or current sheath) that drives it. To form a good pinch, the current sheath and shock front must be closely coupled in a thin layer. In a rough sense, the thickness of this layer is a measure of the final radius of the pinch. Given these extremes, it is easy to see why a given current pulse with given electrodes would demand an optimum operating pressure at which the soft x-ray (or particle) output is maximized.

The geometry of the electrodes also constrains the design. For example, the radial gap between the electrodes at the start of the current sheath influences the operating pressure. After all, the initial current breakdown along the insulator surface is analogous to a dynamic Paschen breakdown, hence there is an optimum pressure-gap product for a given applied voltage and voltage rise-time.

The length of the electrodes also comes into play: the faster the rise-time of the drive current capacitor bank, the shorter the electrode length. This is because one aims to transfer most (if not all) of the electrostatic energy stored in the drive bank into magnetic energy in the circuit, at the point in time when the current sheath has just turned the corner and is to begin its final radial implosion. Since in general, this radial implosion phase is short in duration relative to the axial (or conical in our case) run-down phase, to a good approximation, the bank energy is totally vested as magnetic energy at the time of the implosion. This magnetic energy is itself partitioned between that in the fixed inductance of the drive bank (i.e. the inductance up to and including the initial breakdown path) and that in the time varying inductance due to the coaxial (or conical) run-down. An efficient DPF is one that minimizes the fixed inductance of the drive bank, so that most of the bank energy is invested in the vacuum inductance and therefore more readily available to be tapped by the radial implosion.

But the length may not be set by the above requirement alone. If the pressure is too low, while it may still be true that the current reaches its peak just as it reaches the end of the coaxial (or conical) run-down phase, the velocity imparted to the shock by this current might be too high and cause catastrophic separation between the shock front and the magnetic piston, leading to a poor pinch. Thus one sees that the electrode length and pressure together must be optimized for a given current and rise-time.

Lastly we address the radius of the inner electrode (the anode). This radius (along with the radial implosion time) governs the final radial velocity of the pinch and hence the kinetic energy of the ions as they stagnate on axis. In the case of high atomic number gases such as Neon, Argon or Krypton, this kinetic energy governs the temperature of the pinch, as radiative losses during the implosion increase the sheath density and enable ion-electron stagnation to determine a mean energy distribution that may be assigned a 'temperature'. With lower atomic number species such as D (Deuterium) and T (Tritium), the final pinch might not have a well defined temperature; there is rather a non-Maxwellian energy distribution in the pinch, the high energy tail of which is deemed responsible for a significant fraction of the neutron output from such DPFs.

The design of an optimum pinch is further complicated by the coupling between the coaxial and radial phases. For the inventions herein described, additional parameters are available for optimization. These include changes in the driver-DPF electrical coupling due to conical and/or helical electrode structure, changes in the coupling of the axial run-down to implosion phase, the degree of plasma stabilization by axial magnetic fields during the later part of the run-down and during the radial implosion phase.

Here, as with current state-of-the-art DPFs, tradeoffs will have to be experimentally determined. One example of such a trade-off is between the more stabilizing axial magnetic field and possibly larger pinch spot size (hence lower density).

For the DPF devices of FIGS. 7*a* and 7*b*, the specific electrode dimensions are dependent on both the characteristic current rise time and magnitude, and the dense plasma source application. For current rise times on the order of 1 microsecond and magnitudes of several hundred kA it is believed that the inner electrode radius should be in the range 1 cm to 2 cm, and the outer electrode radius should be in the range 3 cm to 4 cm, while the first acceleration extent 101 should be in the range 4 cm to 8 cm, and the final acceleration extent 103 should be in the range 4 cm to 8 cm. The axial length for the first acceleration extent is also dependent on whether a radial or coaxial initiator geometry is chosen. While these ranges are believed to set forth the best mode of the invention, it is also clear to one skilled in the art that other ranges could be used depending on the DPF driver current rise times and magnitude, as well as the specific plasma focus source application.

Figure 8:
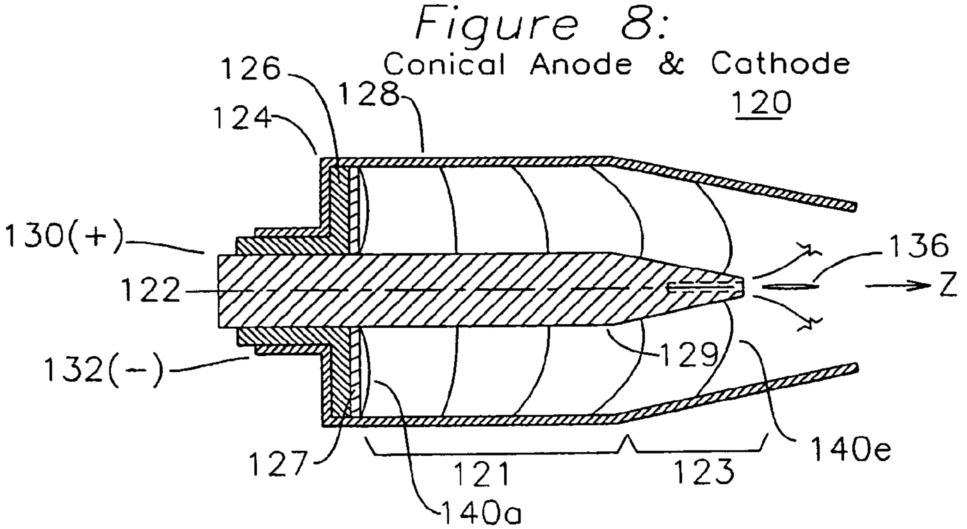
FIG. 8 shows a dense plasma focus apparatus having a conical anode and conical cathode.

FIG. 8 shows a cross section view of a dense plasma focus generator 120 having a center electrode 129 symmetrically disposed about an axis 122. The center electrode 129 is cylindrical over a first plasma acceleration extent 121, and tapered over a second plasma acceleration extent 123. The outer electrode 128 is cylindrical over the first plasma acceleration extent 121, and tapered over the second plasma acceleration extent 123. In this manner, the annular distance from the inner electrode 129 to the outer electrode 128 is generally constant over both the first plasma acceleration extent 121 and final plasma acceleration extent 123. Optimal operation may be obtained by a displacement of the relative axial location of the beginning of taper region on the inner and outer electrodes. The operation of the plasma initiator formed by the insulator 126 and plasma formation disk 127 is similar to the plasma initiators described in FIG. 7*a*, and while FIG. 8 shows a radial initiator geometry including plasma formation disk 127 and insulator 126 in accordance with the plasma initiator formed by insulator 106 and disk 105 of FIG. 7*a*, the plasma generator of FIG. 8 could alternatively use the axial initial plasma generator formed by insulator 107 and plasma formation sleeve 109 of FIG. 7*b*. The sizes of the elements of FIG. 8 are similar to those of FIGS. 7*a* and 7*b*.

Figure 9A:
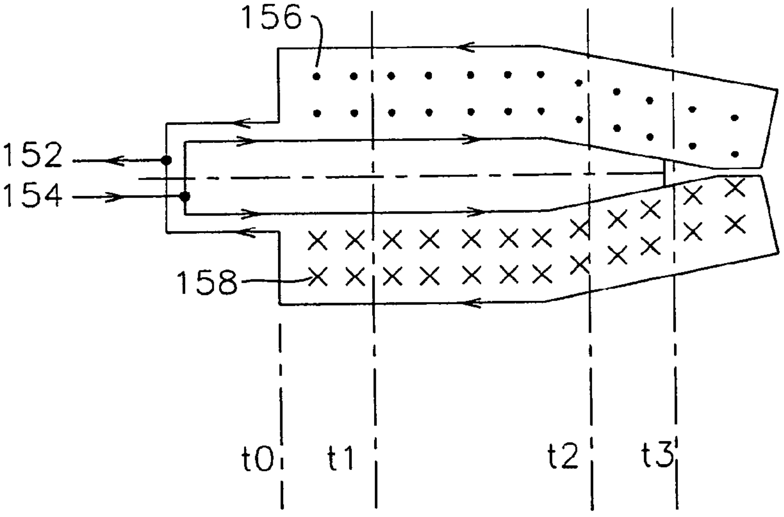
FIG. 9*a* shows the magnetic field formed by the advancing plasma of FIG. 8 at different time intervals.
Figure 9B:
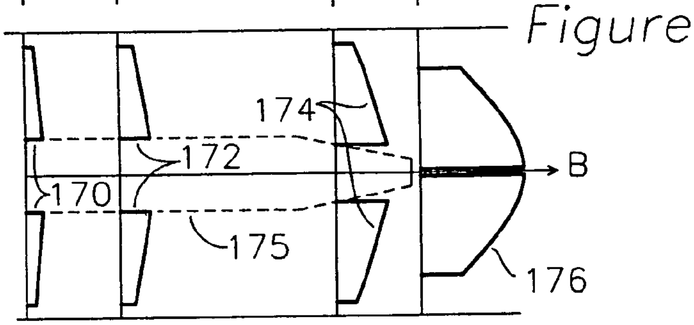
FIG. 9*b* shows the profiles for magnetic field density formed by the advancing plasma of FIG. 8 at different time intervals.

FIG. 9*a* shows the B field profiles across the region from the inner electrode 129 and outer electrode 128 for four sample time intervals t0, t1, t2, and t3 for the dense plasma focus device 120 of FIG. 8. A magnetic B field is generated in the area enclosed by the current, the area growing as the plasma advances from time t0 through t3. The dots 158 represent the head of the B vector and X 156 represents the tail of the B vector, which is azimuthal about the Z axis 122 of FIG. 8. As the magnetic field strength varies as 1/r, the magnetic field strength at the center electrode 129 is higher than the magnetic field strength at the outer electrode 128. As the current grows over time as was shown in FIGS. 3 and 5*b*, the magnetic field strength increases from t0 through t3, as shown in the B field profiles of FIG. 9*b*. As shown by the radial extents of the B field, the B field is 0 outside the extent of current flow, and increases to a maximum closest to the outer radius of the center electrode, which is shown in phantom 175 for reference with the B field waveforms 170 at time t0, 172 in first acceleration extent 121 at time t1, 174 in final acceleration extent 123 at time t2 and 176 beyond the extent of the center electrode at time t3 immediately prior to the on axis z-pinch in the dense plasma focus region. The inner electrode and outer electrode taper in the final acceleration region 123 of FIG. 8 result in an increased inner electrode B field from the reduced electrode radius as shown in B field profile 174 at time t2, thereby producing a greater accelerating magnetic field which becomes a nearly continuous (in the radial direction) B field 176 beyond the extent of the center electrode 175, as shown at time t3.

Figure 10:
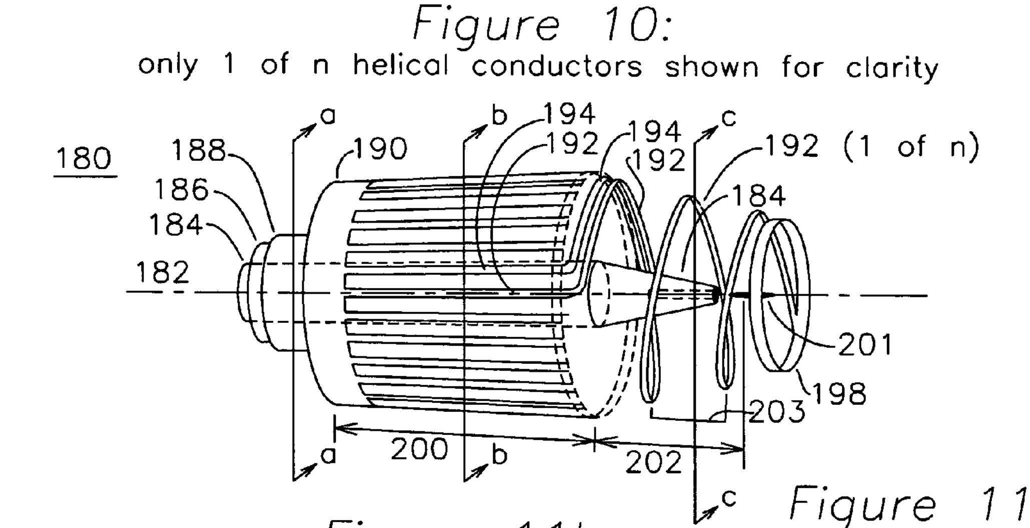
FIG. 10 shows a dense plasma focus device having a solid conical inner electrode and an outer electrode formed from a plurality of individual conductors where the conductors are formed in an axial section and a helical section.

FIG. 10 shows a perspective view of a third embodiment of the dense plasma focus generator 180, which includes a central axis 182 as before, an inner electrode 184 which is cylindrical over a first acceleration extent 200, and tapered over a final acceleration extent 202, as was described for the inner electrode of FIGS. 7*a*, 7*b*, and 8. The insulator 186 may be formed to produce the radial plasma initiator as shown in FIG. 7*a* insulator 106 and plasma formation disk 105, or alternatively, it may be formed to produce the axial plasma initiator as shown by insulator 107 and plasma formation sleeve 109 of FIG. 7*b*. The outer electrode 188 includes an outer cylindrical conductor 190, which serves as a common electrical attachment point for a plurality n of individual conductors which start from the cylindrical attachment conductor 190. N conductors are used in first acceleration region 200, two of which are conductors 192 and 194. Each of the N conductor is substantially parallel to the axis 182 in the first acceleration region 200, and each conductor is uniformly spaced from adjacent conductors and from the center axis 182. The outer electrode conductors in the first acceleration region 200 need not be mechanically or electrically isolated. In the final acceleration region, the N conductors undergo a helical and tapered trajectory, rotating about the axis 182, while the radius separating from the center axis is reduced until the conductors are secured by a final ring 198, which may be either conductive or non-conductive, and serves to mechanically support the plurality of individual conductors. Conductor 194 is shown in the first acceleration extent and in transition to the first turn of the final acceleration extent, while conductor 192 in completely shown as substantially axial in first acceleration extent 200 and helical as it rotates about the taper of the center electrode 184, terminating in final ring 198. Each of the N conductors follow the helical path shown for conductor 192. Optimal operation may be obtained by a displacement of the relative axial location of the beginning of tapered extent on the inner and outer electrodes. Further optimization for specific DPF source applications may involve a displacement in the z axis of the beginning of the outer electrode taper and helical extent. In this manner, each of the N conductors may be an individual axial conductor or may be mechanically and electrically connected, in first acceleration region 200, and makes a transition to a tapered and helical extent in the final acceleration region, with each of the N conductor being mechanically and electrically isolated from each other, up to termination in the final ring 198.

Figure 11A:
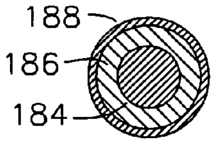
FIG. 11*a*, 11*b*, and 11*c* show cross section views of the structure and fields produced by the device of FIG. 10.
Figure 11B:
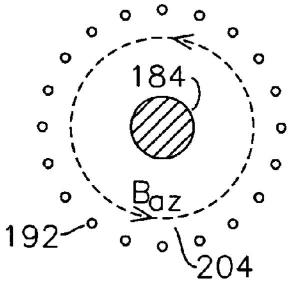
Figure 11C:
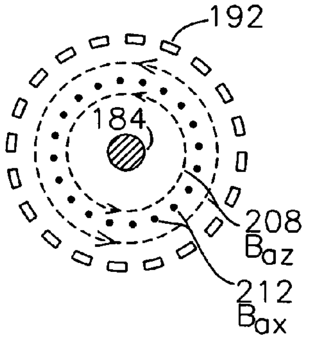

FIG. 11*a* shows section a-a through FIG. 10, which includes inner conductor 184, insulator 186, and outer electrode 188. FIG. 11*b* shows the section b-b through FIG. 10 in the first acceleration extent 200 for the case N=20, and shows inner electrode 184, the azimuthal B field 204 produced behind the advancing plasma (not shown), and the individual outer conductors, including conductor 192. FIG. 11*c* shows the section c-c of FIG. 10 in the final acceleration region for the case N=20, including tapered inner electrode 184, outer electrode formed by the plurality N of individual conductors, one of which is shown as conductor 192. Plasma current flows from center electrode 184 through the plasma to the N outer electrodes such as 192, and the helical oriented return current on each of the N outer electrodes generates a current path enclosed magnetic field having an azimuthal component $B_{az}$ 208 from the component of return current flowing on conductor 192 which is axial, as was also shown in FIG. 11*b* 204, and the component of return current which is helical in the final acceleration region of conductor 192 additionally generates an axial magnetic field component $B_{ax}$ 212. The combination of $B_{ax}$ and $B_{az}$ produce a magnetic field vector which results in a stabilized plasma in the pinch region 201 of FIG. 10.

Figure 12:
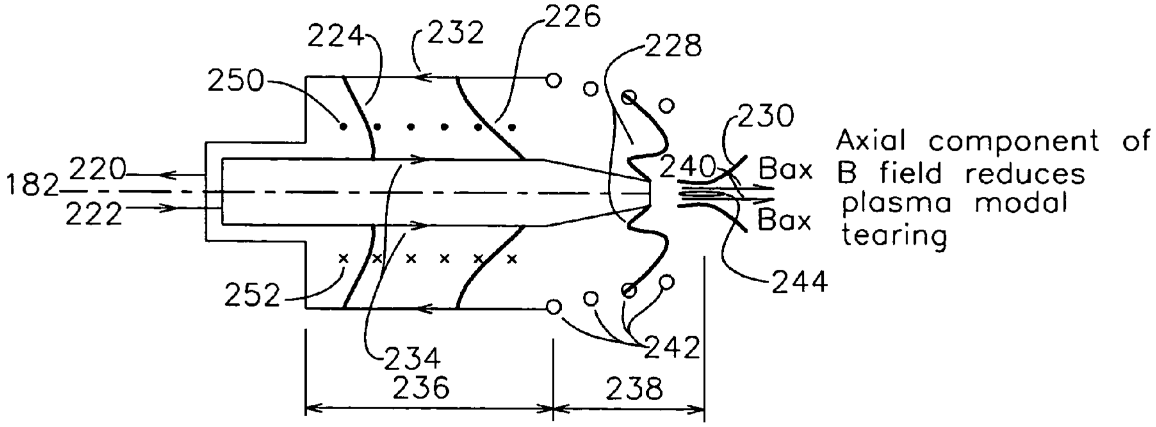
FIG. 12 shows the magnetic fields and sample plasma contours produced by the device of FIG. 10.

FIG. 12 shows the effect of the axial B field 240 on the plasma as it approaches the pinch zone. After plasma initiation and during acceleration along the Z axis, the plasma is shown as contour 224. The return currents of the plasma traveling in the N outer conductor helical structures cause an axial B field component 240, and this B field interacts with the plasma prior to the pinch zone 244 to damp and reduce the axial instability related modes which develop as the plasma radially converges towards the pinch zone. The effect of axial magnetic field $B_{ax}$ 244 occurs in final acceleration region 238 of FIG. 12 prior to and during the plasma pinch 244.

The axial magnetic field begins to grow as soon as the outer perimeter of the plasma front splits into a number of spokes corresponding to the number of individual outer conductors and begins to move along the helical outer electrode region 202. The helical twist in these individual outer conductors will produce an axial magnetic field, to the extent that the individual spokes of current flow independently along the rods/vanes. It is important to note that this axial magnetic field $B_{ax}$ 240 occupies the volume between the individual helical outer conductors and the inward radially moving current sheet once the plasma front has passed beyond the inner electrode 184 extent. The conductivity of the plasma front, and the plasma shock in preceding it, is high enough to exclude the axial magnetic field $B_{ax}$ 212 from penetrating the plasma on the time scale of the radial implosion, which is typically on the order of 100-200 ns. Such a magnetic field exclusion is also critical for the azimuthal magnetic field which drives the axial acceleration and radial implosion in such DPFs. Thus the axial field induced stabilization being described and disclosed here in distinct from that of a radial plasma that pinches onto an embedded axial magnetic field, existing interior to the radially imploding plasma front, as has been implemented by others in the prior art. In this latter case of an embedded axial magnetic field, it has been suggested in the prior art that the combination of axial and azimuthal fields in a plasma pinch creates a helical confining field that stabilizes the pinch and confines it for longer than without the axial component. However in the course of such stabilization, the radially imploding plasma front does work on the embedded axial field, compressing it as the pinch reduces its radial extent, resulting in reduced temperatures and density of the plasma focus formed on axis. The structure of the present invention FIG. 10 et seq contrasts to the prior art as the pinch does not compress the axial magnetic field in the present invention until the pinch begins to expand radially outwards after radiation or particle generation. Hence the introduction of an axial field is not an energy sink, per se. The inventors believe that the axial magnetic field component serves mainly to stabilize the implosion, by combining with the azimuthal field to produce a helical magnetic field that is outside the current sheet. The added stability of this helical magnetic field component increase the final density and duration of confinement of the dense hot plasma on axis, thereby increasing the efficiency of particle or radiation production.

Variations on the dense plasma focus apparatus of FIGS. 7*a*, 7*b*, 8, and 10 are possible. The primary variations, beyond that described in detail above involve the specific details of the geometry of the radial or axial geometry which are required to obtain the azimuthally symmetric plasma initiation between the inner and outer electrodes. This geometry is in turn dependent on the choice in polarity of inner to outer electrodes. Additional variations include the introduction of pulsed, localized gas injection in various regions of the DPF to modify the mass distribution encountered in the initiation region, by the plasma front in the axial phase, or by the plasma front during the radial implosion phase which culminates in the on-axis plasma focus. The introduction of additional gas to the initial working gas fill may be of an alternative species of gas.

In this manner, an improved dense plasma focus apparatus is described.

We claim:

1. A device for the production of high energy particles including neutrons or x-rays, the device having:

an inner electrode having an initiator end and a plasma focus end, said inner electrode disposed about an axis, said inner electrode having, in sequence, said initiator end, a cylindrical region having a substantially constant first radius through a first acceleration extent, and a tapered final region having a final acceleration extent, said inner electrode radius monotonically decreasing from said first radius through said final region and terminating in said plasma focus end;

an outer electrode having, in sequence along said axis: a conductor connection region, an acceleration region, and a final region over said final acceleration extent, said outer electrode formed from an annular conductor electrically connected to a plurality of individual conductors in said conductor connection region, each said individual conductor spaced a uniform distance from said inner electrode and each said individual conductor oriented substantially coaxially to and also parallel to said inner electrode axis in said acceleration region, said individual conductors leading to said final region along said final acceleration extent and said individual conductors thereafter arranged helically about said inner electrode axis over said final region and terminating in said plasma focus end, each said individual conductor electrically continuous from said accelerator region through said final region;

said outer cylindrical electrode enclosing a gas for the generation of said neutrons or x-rays, said gas including a low atomic number gas such as Deuterium (D) or Tritium (T) or a high atomic number gas such as Neon (Ne), Argon (Ar), or Krypton (Kr);

an insulator disposed adjacent to said conductor connection region and said central electrode;

where for any given point on said axis of said inner electrode, the radial distance measured from a point on said axis to a point on each said conductor perpendicular to said axis is substantially equal, said radial distance monotonically reducing from a first value substantially equal to said outer electrode cylindrical radius to a second value greater than zero and less than said first value over said final region extent;

where a plasma forming in said initiator end has a velocity substantially parallel to said inner electrode axis and said plasma generates a magnetic field which is azimuthal to said inner electrode axis over said acceleration region, said plasma forming a plasma front which accelerates without generating a substantial axial magnetic field through said connection region or said acceleration region, the magnetic field generated by currents returning through said individual helical conductors of said final region generating an axial magnetic field component which stabilizes said plasma front in said final region such that said plasma has a velocity that is substantially perpendicular to said inner electrode axis in a dense plasma region where said plasma generates and is surrounded by a magnetic field that is substantially parallel to said inner electrode axis, said plasma having sufficient density in said dense plasma region to generate neutrons or x-rays.

2. The device of claim 1 where said plasma initiation includes a plasma forming substantially radially from said plasma initiation end of said inner electrode initiator end to said outer electrode conductor connection region.

3. The device of claim 1 where said insulator comprises a disk having a plasma initiation surface substantially perpendicular to said inner electrode axis.

4. The device of claim 3 where said insulator includes a high refractory material located on said plasma initiation surface.

5. The device of claim 4 where said refractory material is either ceramic or glass.

6. The device of claim 1 where said plasma initiation includes a plasma forming substantially axially from said plasma initiation end of said inner electrode to said outer electrode.

7. The device of claim 1 where said insulator comprises a sleeve with an inner surface proximal to said inner electrode, said sleeve outer plasma initiation surface substantially coaxial to said inner electrode axis.

8. The device of claim 7 where said insulator includes a refractory material located on said plasma initiation surface.

9. The device of claim 8 where said refractory material is either ceramic or glass.

10. The device of claim 1 where said inner electrode includes an axial counter bore on said dense plasma focus end.

11. The device of claim 1 where said inner electrode is cooled by a circulating fluid.

12. The device of claim 1 where said at least one of said inner electrode or said outer electrode individual conductors are formed from stainless steel or oxygen free copper.

13. The device of claim 1 where said first acceleration extent is from 4 cm to 8 cm.

14. The device of claim 1 where said final acceleration extent is from 4 cm to 8 cm.

15. The device of claim 1 where the annular separation from said inner electrode to said outer electrode conductors is from 2 cm to 4 cm.

* * * * *